April 24, 1928.
J. L. AHERN ET AL
1,667,092
PISTON AND ROD PACKING
Filed March 30, 1927
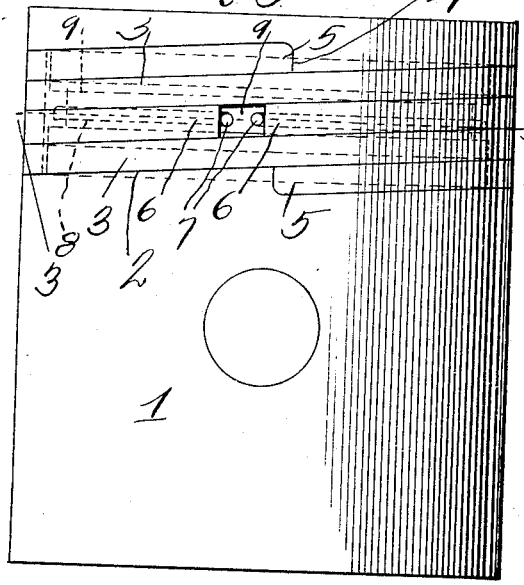
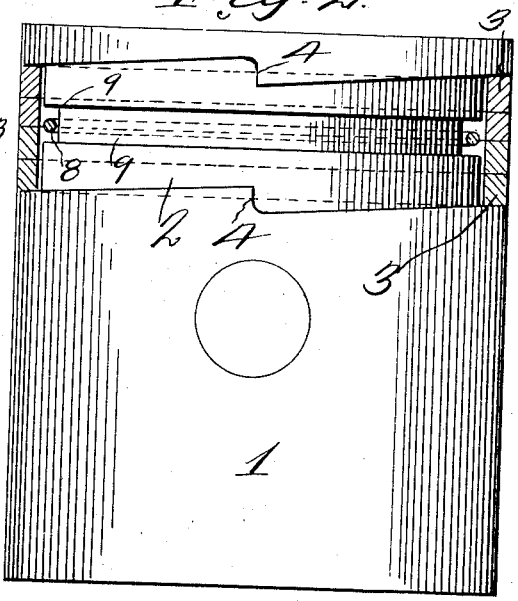
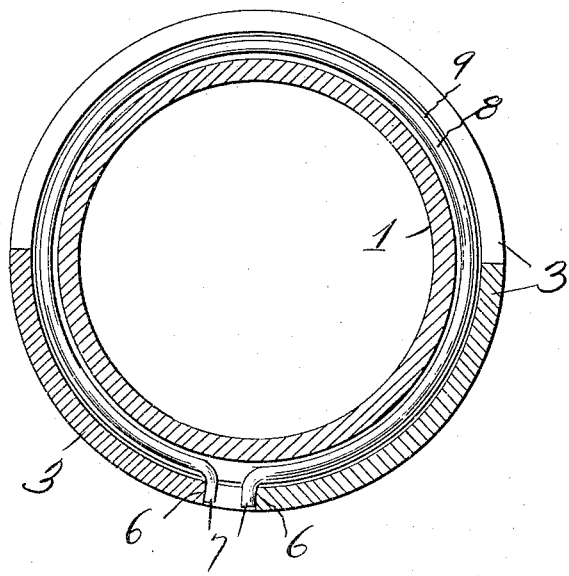
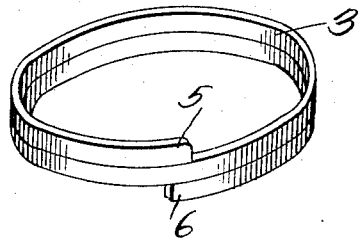
Inventors
James Leo Ahern
Letcher G. Ledger
By Philip A. H. Ferrell
Attorney Patented Apr. 24, 1928.

1,667,092

UNITED STATES PATENT OFFICE.

JAMES LEO AHERN AND LETCHER GILBERT LEDGER, OF NEW ORLEANS, LOUISIANA.

PISTON AND ROD PACKING.

Application filed March 30, 1927. Serial No. 179,509.

The invention relates to piston and rod packing and has for its object to provide a device of this character disposed in a channel of a piston and formed from a plurality of helically shaped packing rings, the ends of the outer convolutions of the rings engaging abutments and an expansible member co-operating with the inner ends of the inner convolutions and forming means for expanding the helical rings and taking up play incident to cylinder, ring or piston wear.

A further object is to provide an annular groove spaced from the upper and lower sides of the piston grooves, and in which annular groove is disposed an expansible ring extending substantially the entire distance around the piston and having its ends in engagement with the inner adjacent ends of the helically shaped packing members whereby the outer ends of the packing members are maintained in engagement with abutments and the helical packing ring convolutions expanded for taking up wear on the cylinder and rings.

A further object is to proportion the ring groove and helical packing rings whereby when said rings are in position the convolutions thereof will engage each other and the expansive action thereof will be against the upper and lower sides of the packing groove.

A further object is to provide a piston with packing rings helically shaped, the convolutions of which engage each other when the rings are in position; means for imparting an expansive action on the rings and means cooperating with the outer convolutions of the rings whereby rotation thereof is limited against the action of the expansive means.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of a piston showing the packing member applied thereto.

Figure 2 is a view in elevation of a conventional form of piston, showing the packing rings in vertical transverse section.

Figure 3 is a horizontal sectional view taken on line 3—3 of Figure 1.

Figure 4 is a perspective view of one of the rings, showing the same compressed.

Referring to the drawing, the numeral 1 designates a conventional form of piston, for instance the type used in connection with internal combustion engines, however it is to be understood the piston packing hereinafter set forth may be used in connection with any kind of a piston or rod where a packing is necessary. The piston 1 is provided with a relatively wide piston groove 2 for the reception of helically shaped piston rings 3. The rings 3 are of an expansive type, and the ring shown in Figure 4 is shown in compressed condition, that is, in the position it assumes when assembled on the piston. It is to be understood however that any number of convolutions may be used as desired, and two are shown for purposes of illustration only. Two helical packing rings 3 are used in the groove 2 and when placed in position are compressed whereby their adjacent sides are in engagement with each other, thereby preventing a spiral leakage and insuring a positive sealing at all times. The groove 2 at its upper and lower side is provided with shoulders 4 against which the ends 5 of the upper and lower convolutions of the helical rings engage, therefore it will be seen that when pressure is exerted against the ends 6 of the inner adjacent convolutions of the packing rings 3, the convolutions of said rings 3 will be expanded thereby taking up any play which may develop incident to wear on a cylinder wall, on the piston rings or otherwise, and said convolutions will adapt themselves to the shape of the cylinder, for instance when the cylinder is worn out of round, which is one of the common causes of leakage and loss of compression in internal combustion engines. It will also be seen that there is a frictional engagement of the rings with a cylinder wall, consequently noise or pounding is eliminated when the piston or plunger reverses its direction of motion. This is also prevented by the expansive action of the helical rings against the upper and lower sides of the groove 2. It will be noted that the adjacent ends 6 of the helical rings 3 are spaced apart and are engaged by outwardly extending arms 7 carried by a substantially annular expansible member 8, which member 8 encircles the piston within a groove 9 in the bottom of the groove 2, and spaced from the upper and lower ends of the groove 2, consequently the expansive member 8 will exert simultaneously pressure on the ends 6, thereby expanding the convolutions of the packing members 3, so that said packing members will take up any play incident to wear on the packing members or cylinder and will cause said packing members to conform to the surfaces over which they move. It will be noted that the interior diameter of the expansive member 8 is greater than the inside diameter of the groove 9, and its outside diameter less than the inside diameter of the helical packing members 3, therefore it will be seen that said member 8 will be free to expand or contract and will not become bound by engagement with adjacent parts, consequently will impart a positive expansive action through the members 7 on the adjacent ends of the helical packing members.

From the above it will be seen that the packing members will automatically adjust themselves for taking up wear, will seal sidewise in relation to each other and to the upper and lower walls of the groove as well as against the cylinder wall, consequently will positively prevent leakage or escape of matter or substance from one side of the piston to the other, consequently affords the highest degree of efficiency. It is to be understood that any number of helical packing rings may be used, and the particular showing is for purposes of illustration, as it is obvious the number used would vary according to the type and size of piston or rod to be packed. In manufacture the helical packing rings are preferably made with outside diameters greater than the piston on which the rings are to be used and are compressed to the inside diameter of a cylinder as shown in the drawing.

The invention having been set forth what is claimed as new and useful is:—

1. The combination with a piston having a piston groove therein, superimposed helically shaped packing rings disposed in said grooves, shoulders carried by the piston and engaging the ends of the outer convolutions of the rings for preventing rotation thereof in opposite directions and expansible means interposed between the adjacent ends of the adjacent convolutions and forming means for maintaining the rings in engagement with the shoulders and expanding the convolutions of the rings.

2. The combination with a piston packing comprising helically shaped expansible rings disposed in a piston groove, shoulders carried by the piston and engaging the end convolutions of the ring and preventing rotation thereof in opposite directions, of an expansible ring disposed in an auxiliary groove in the bottom of the first mentioned groove, said expansible ring cooperating with the inner adjacent convolutions of the rings.

3. The combination with a piston packing comprising helically shaped expansible rings disposed in a piston groove, of an expansible ring in the bottom of the groove, said expansible ring having outwardly extending arms engaging the ends of the inner convolutions of the rings.

4. The combination with the adjacent inner ends of superimposed helically shaped packing rings disposed in a piston groove and limited in their rotation in opposite directions, of an annular expansible member disposed in an annular groove in the bottom of the piston groove, the ends of said annular member terminating adjacent the inner adjacent ends of the packing rings, and outwardly extending arms carried by the ends of the expansible member and engaging the ends of the inner convolutions of the packing rings.

In testimony whereof we hereunto affix our signatures.

JAMES LEO AHERN.
LETCHER GILBERT LEDGER.